United States Patent
Lee et al.

(10) Patent No.: US 7,605,848 B2
(45) Date of Patent: Oct. 20, 2009

(54) METHOD FOR COLOR FILTER ARRAY INTERPOLATION USING COLOR CORRELATION SIMILARITY AND MULTI-DIRECTION EDGE INFORMATION

(75) Inventors: Ho-young Lee, Suwon-si (KR); Sung-su Kim, Yongin-si (KR); Du-sik Park, Suwon-si (KR); Chang-yeong Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 640 days.

(21) Appl. No.: 11/335,499

(22) Filed: Jan. 20, 2006

(65) Prior Publication Data
US 2006/0170798 A1    Aug. 3, 2006

(30) Foreign Application Priority Data
Feb. 3, 2005    (KR) ............... 10-2005-0010084

(51) Int. Cl.
*H04N 9/73* (2006.01)
*H04N 5/228* (2006.01)
(52) U.S. Cl. ............... 348/223.1; 348/222.1
(58) Field of Classification Search ............ 348/222.1, 348/223.1
See application file for complete search history.

(56) References Cited

U.S. PATENT DOCUMENTS 5,038,216 A * 8/1991 Easterly et al. ............ 348/364
6,563,537 B1 * 5/2003 Kawamura et al. .......... 348/252

FOREIGN PATENT DOCUMENTS

JP    11-103466 A    4/1999

* cited by examiner

*Primary Examiner*—James M Hannett
(74) *Attorney, Agent, or Firm*—Sughrue Mion, PLLC

(57) ABSTRACT

A method is provided for reducing occurrence of color fringe errors occurred at the time of carrying out a color filter interpolation and reducing degradation of an image quality. Interpolation of a G channel value in a pixel of the color filter having only R or B channel values is carried out such that a similarity measured between channels based on interpolation results in horizontal and vertical directions are measured, and the G channel interpolation is carried out in a direction where the measured similarity becomes the maximized. However, when the reliability of the measured similarity becomes poor, a final G channel interpolation is carried out using a weighted average value using similarity information of each direction and interpolation results of the horizontal and vertical directions.

11 Claims, 5 Drawing Sheets

G PLANE    R PLANE    B PLANE

FIG. 7

| | | | | | | |
|---|---|---|---|---|---|---|
| | | | | | | |
| $G_{26}$ | $R_1$ | $G_2$ | $R_3$ | $G_4$ | $R_5$ | $G_{23}$ |
| | $G_6$ | $B_7$ | $G_8$ | $B_9$ | $G_{10}$ | |
| $G_{30}$ | $R_{13}$ | $G_{12}$ | $R_{13}$ | $G_{14}$ | $R_{15}$ | $G_{31}$ |
| | $G_{16}$ | $B_{17}$ | $G_{18}$ | $B_{19}$ | $G_{20}$ | |
| $G_{29}$ | $R_{21}$ | $G_{22}$ | $R_{23}$ | $G_{24}$ | $R_{25}$ | $G_{27}$ |
| | | | | | | | though
METHOD FOR COLOR FILTER ARRAY INTERPOLATION USING COLOR CORRELATION SIMILARITY AND MULTI-DIRECTION EDGE INFORMATION

CROSS-REFERENCE TO RELATED APPLICATIONS

This application claims priority from Korean Patent Application No. 2005-10084, filed on Feb. 3, 2005, the entire content of which is incorporated herein by reference.

BACKGROUND OF THE INVENTION

1. Field of the Invention

Methods consistent with the present invention relate to color filter interpolation for acquiring a color image by means of an image acquired by an image sensor, and in particular, to color interpolation using a color correlation similarity and multi-direction edge information.

2. Description of the Related Art

Videos acquired by an image sensor are monochrome, so that three colors of red (R), green (G), and blue (B) are required at each pixel position in order to acquire a color video. To this end, most digital video apparatuses has a color filter disposed in front of an image sensor which allows only a specific frequency band to be transmitted in a visible light region so that the color video is acquired.

FIG. 1 is a view illustrating a video provided to a conventional digital video apparatus. Hereinafter, a flow of the video provided to the digital video apparatus will be described with reference to FIG. 1.

The video is provided to a color filter 102 via a lens 100. The color filter 102 provides the video having a specific frequency band among received videos. As shown in FIG. 1, the color filter 102 is composed of several regions, and each region allows only a video having the same frequency band as the frequency band of one color among R, G and B colors to be transmitted. The video transmitted by the color filter 102 is provided to an image sensor 104. The image sensor 104 converts the received video signal into an electrical video signal. FIG. 1 shows the video signal output from the image sensor 104.

Referring to FIG. 1, a right upper end illustrates the color filter 102 formed by the video having the same frequency band as the frequency band of R color, a right center end illustrates the color filter 102 formed by the video having the same frequency band as the frequency band of G color, and a right lower end illustrates the color filter 102 formed by the video having the same frequency band as the frequency band of B color.

In general, each pixel is composed of three channel values of R, G, and B for representing a color. However, each pixel which has transmitted the color filter has a pixel value composed of one channel value among three channel values of R, G, and B. That is, the right upper end of FIG. 1 corresponds to a video only having the R channel value, the right center end corresponds to a video only having the G channel value, and the right lower end corresponds to a video only having the B channel value. Hereinafter, the R channel value, the G channel value, and the B channel value will be collectively referred to as a color value for simplicity of description.

FIG. 2 illustrates an example of an arranged structure of the color filter of FIG. 1. In particular, FIG. 2 shows the arranged structure of Bayer pattern. Referring to FIG. 2, a video is composed of plurality of pixels, and each pixel represents only one color among R, G, and B colors. In particular, the number of G pixels is larger than the number of R or B pixels. That is, the number of the G pixels is equal to a sum of the number of the R pixels and the number of the B pixels. This is because that the G color is closest to a luminance component and people are most sensitive to the G color.

As such, one pixel is not represented by three colors of R, G, and B, but represented by only one color for the sake of reducing a cost of the digital video apparatus. That is, when one pixel is represented by three colors, the cost of the digital video apparatus increases. Accordingly, a channel value of the color representing a pixel or a channel value of a pixel adjacent to the pixel is employed for a color which is not represented. A method of acquiring the channel value of the color not represented by using the channel value representing the pixel or the channel value of the adjacent pixel is referred to as a color filter array (CFA) interpolation.

Hereinafter, the CFA interpolation will be schematically described with reference to FIG. 2. Referring to FIG. 2A, a video input by the Bayer pattern is divided into three planes. Three planes are R, G, and B planes. As described above, it can be seen that the number of pixels constituting the G plane is relatively larger than the number of the pixels of the R plane or the number of the pixels of the B plane. That is, the number of the R pixels included in the R plane and the number of the B pixels included in the B plane are four, respectively, however, the number of the G pixels included in the G plane is eight. Accordingly, a pixel which does not represent the color in the R, G, and B planes acquires a color value by means of the CFA interpolation. This is accomplished by operation (B). By carrying out the CFA interpolation, all pixels constituting the R, G, and B planes have R, G, and B channel values, respectively. In general, the CFA interpolation is carried out such that the interpolation is first carried out on the G plane and then carried out on the R and B planes. In addition, by means of operation (C), the CFA interpolation acquires one video using three planes. Hereinafter, the conventional CFA interpolation method will be described.

1) Gradient Based Method

The gradient based method carries out the interpolation on the G channel value of the G pixel in response to the edge pattern of the video. That is, an edge component of the pixel positioned in the vertical direction is measured, and an edge component of the pixel positioned in the horizontal direction is measured. The interpolation is carried out in consideration of the direction having the higher values of the edge components among measured values of the edge components in the horizontal and vertical directions. Hereinafter, a description will be given with reference to FIG. 3.

A case of interpolating the G channel values of the pixel 5 among pixels shown in FIG. 3 will be described. Edge components of the horizontal direction are first extracted using the channel values of pixel 3 (R), pixel 4 (G), pixel 5 (R), pixel 6 (G), and pixel 7 (R). And edge components of vertical direction are then extracted using the channel values of pixel 1 (R), pixel 2 (G), pixel 5 (R), pixel 8 (G), and pixel 9 (R). Equation 1 below corresponds to an example of extracting the edge components of the horizontal direction and the edge components of the vertical direction. Ra, Ga, and Ba (a is an arbitrary natural number) denoted in Equation 1 represent the channel values of the corresponding color at the respective pixels.

$$\Delta H = |G_4 - G_6| + |2 \times R_5 - R_3 - R_7|$$

$$\Delta V = |G_2 - G_8| + |2 \times R_5 - R_1 - R_9| \qquad \text{Equation 1}$$

$\Delta H$ denotes the edge component of the horizontal direction, and $\Delta V$ denotes the edge component of the vertical direction. Equation 2 below corresponds to a case of carrying out the interpolation in consideration of the edge components of the horizontal direction and the edge components of the vertical direction.

$$\text{if}(\Delta H > \Delta V), G_5 = (G_2 + G_8)/2 + (R_5 - R_1 + R_5 - R_9)/4$$

$$\text{else if}(\Delta H < \Delta V), G_5 = (G_4 + G_6)/2 + (R_5 - R_3 + R_5 - R_7)/4$$

$$\text{else } G_5 = (G_2 + G_4 + G_6 + G_8)/4 + (4 \times R_5 - R_1 - R_9 - R_3 - R_7)/8 \quad \text{Equation 2}$$

The gradient based method is advantageous in terms of sharpness and color fringe error as compared to the conventional interpolation method, however, still has many color fringe errors. Further, it estimates the edge direction using only a difference between edge components, so that the image quality is degraded due to frequent changes in the interpolation direction.

2) Constant Hue Based Interpolation

The constant hue based interpolation method has been proposed in consideration of the fact that the conventional interpolation method allows an abrupt change in the hue component to occur to thereby cause many color fringe errors. That is, the constant hue based interpolation method carries out the hue based interpolation after carrying out the conventional interpolation so that a performance of the color interpolation is enhanced. The constant hue based interpolation method assumes that a color rate between adjacent pixels (positional components: (x, y)) is same when the change in the hue component is small in the small region. Equation 3 below corresponds to a case of having the same color rate between adjacent pixels.

$$R_y/G_y = R_x/G_x$$

$$R_y = G_y \times (R_x/G_x) \quad \text{Equation 3}$$

The constant hue based interpolation method acquires the G plane (c) consisting of G pixels in the Bayer pattern in response to the Bayer pattern, and acquires the G plane (f) by carrying out the conventional interpolation on the acquired G plane (c) as shown in FIG. 2. A color filter interpolation is then carried out on the R and B planes using the acquired G planes. Hereinafter, a method of determining $R_2$ and $B_3$ will be described with reference to FIG. 4. FIG. 4 shows the G plane where the interpolation has been carried out and R and B planes where the interpolation is not carried out. Equation 4 below corresponds to a case of determining the $R_2$ and $B_3$.

$$R_2 = G_2 \times \{(R_1/G_1) + (R_3/G_3)\}/2$$

$$B_3 = G_3 \times \{(B_2/G_2) + (B_4/G_4)\}/2 \quad \text{Equation 4}$$

The constant hue based interpolation method can reduce the color fringe errors. However, it carries out the interpolation using the G plane, so that when a reliability about the interpolation result on the G plane becomes poor, a reliability about the interpolation on the R or B plane may also become poor, which may cause the color fringe errors to occur.

3) Pei's Method

Pei's interpolation method is a modified method of the constant hue based interpolation method, which uses R pixels of the R plane and B pixels of the B plane when an interpolation is carried out on the G plane. The Pei's interpolation method is superior to the gradient based method and the constant hue interpolation method in terms of color fringe error. However, it has a problem that zipper artifacts occur because it does not consider the edge information at the time of carrying out the G interpolation. Accordingly, a method capable of effectively carrying out the color interpolation is required.

SUMMARY OF THE INVENTION

The present invention provides a method of capable of reducing color fringe errors and reducing degradation of image quality.

According to one aspect of the present invention, there is provided a method of acquiring a G channel value in a pixel having a R channel value or a B channel value in a video display apparatus displaying the video input using a plurality of pixels, each pixel having one channel value among three channel values of R, G and B colors, the method includes: calculating a difference between channel values of pixels positioned in a vertical direction, and a difference between channel values of pixels positioned in a horizontal direction; and when the calculated difference between the channel values in the vertical direction and calculated difference between the channel values in the horizontal direction being not less than a threshold value, acquiring the G channel value from the channel value of the pixel positioned in any one direction selected between the horizontal direction and the vertical direction.

According to another aspect of the present invention, there is provided a method of acquiring a R channel value in a pixel having a B channel value in a video display apparatus displaying the video input using a plurality of pixels, each pixel having one channel value among three channel values of R, G and B colors, the method includes: acquiring an edge direction from channel values of pixels having a G channel value positioned around the pixel; and acquiring the R channel value from the G channel value and the B channel value positioned in the acquired direction.

According to yet another aspect of the present invention, there is provided a method of acquiring a R channel value in a pixel having a G channel value in a video display apparatus displaying the video input using a plurality of pixels, each pixel having one channel value among three channel values of R, G and B colors, the method includes: acquiring the G channel value from a pixel the R channel value positioned around the pixel; and acquiring the R channel value of the pixel from the acquired G channel value and the G channel value positioned around the pixel.

BRIEF DESCRIPTION OF THE DRAWINGS

The above and/or other aspects of the present invention will be more apparent by describing certain exemplary embodiments of the present invention with reference to the accompanying drawings, in which:

FIG. 7 is a view for explaining a method of carrying out a RGB color filter interpolation in accordance with an exemplary embodiment of the present invention.

DETAILED DESCRIPTION OF THE EXEMPLARY EMBODIMENTS

Hereinafter, methods of carrying out color interpolation according to exemplary embodiments of the present invention will be described with reference to accompanying drawings.

Figure 1:
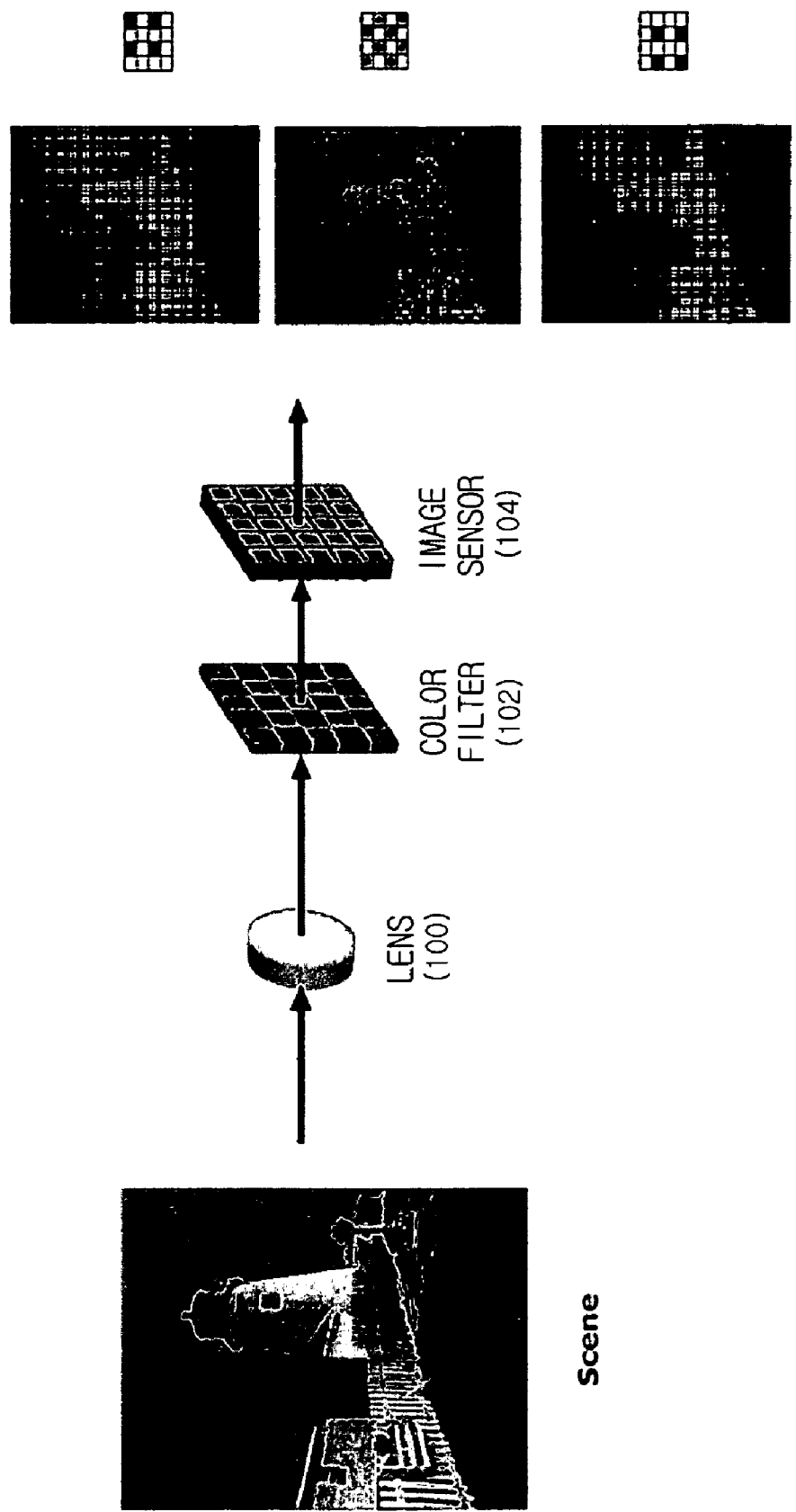
FIG. 1 is a view illustrating a video provided to a digital video apparatus.
Figure 2:
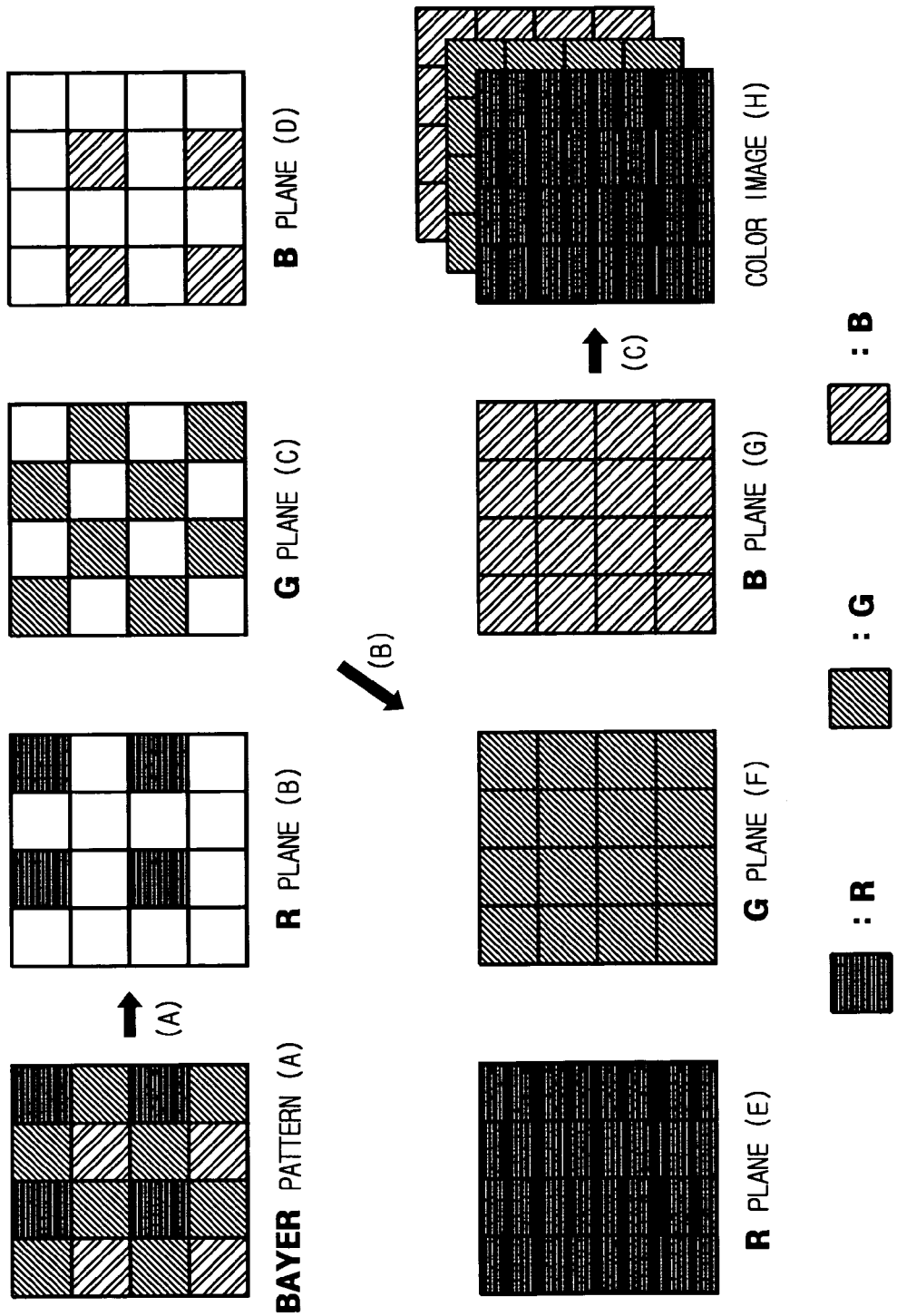
FIG. 2 is a view illustrating an exemplary RGB color filter interpolation by means of Bayer pattern.
Figure 3:
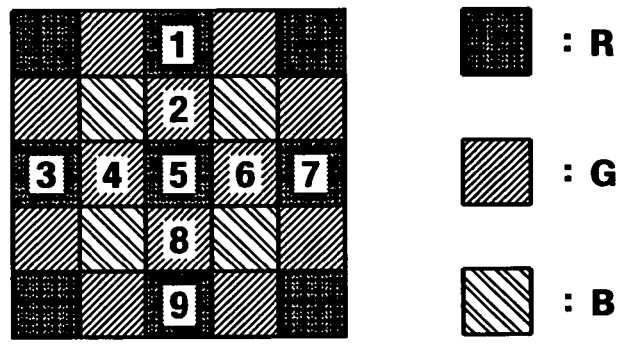
FIG. 3 is a view illustrating an exemplary RGB color filter interpolation by a gradient based method.
Figure 4:
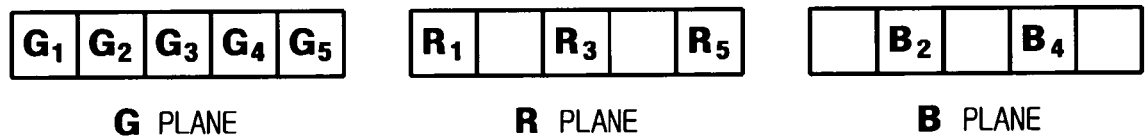
FIG. 4 is a view illustrating an exemplary RGB color filter interpolation by a constant hue based method.
Figure 5:
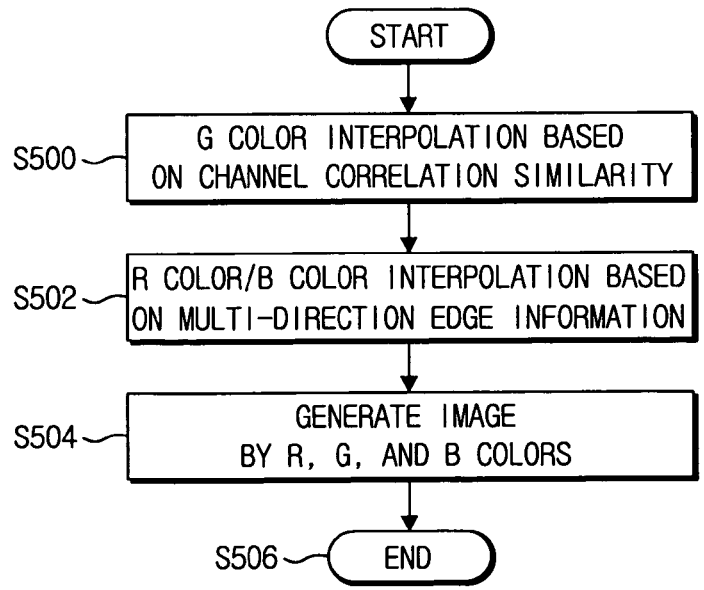
FIG. 5 is a flow chart illustrating a procedure of carrying out a RGB color filter interpolation in accordance with an exemplary embodiment of the present invention.

FIG. 5 is another flow chart schematically illustrating a procedure of carrying out a RGB color filter interpolation in accordance with an exemplary embodiment of the present invention.

Hereinafter, the color filter interpolation proposed by the present invention will be schematically described with reference to FIG. 5. A unit carrying out the color interpolation will be hereinafter referred to as a color interpolation unit for simplicity of description.

In a operation S500, the color interpolation unit carries out a G channel interpolation based on a channel correlation similarity. In a case of the Bayer pattern, it occupies 50% of the G pixel in the total pixels so that a color fringe error due to the G channel interpolation can be removed.

In a operation S502, the color interpolation unit carries out a R channel interpolation and a B channel interpolation based on multi-direction edge information. As described above, in a case of the R and B channels, many zipper artifacts occur due to the interpolation errors, so that the multi-direction interpolation is carried out using the G channel values.

In a operation S504, an image is generated by pixels combining channel values which form R plane, G plane, and B plane generated by completing the interpolation, and a procedure is terminated in a operation S506. Hereinafter, the operation S500 and the operation S502 will be sequentially described.

1) G Channel Interpolation Based on the Channel Correlation Similarity

According to the conventional gradient method, occurrence of aliasing was suppressed using a band pass filter for the R and B channels given that when G channel aliasing occurs, the same aliasing occurs in the R and B channels. However, when a high correlation is not present between the G channel value, and the R channel value and the B channel value, that is, when the aliasing occurred in the G channel is not same as the aliasing occurred in the R or B channel, a potential problem still exists. In addition, the gradient based method determines the interpolation direction using a magnitude of the edge component as shown in Equation 1, so that a discontinuity of the video increases due to frequent changes in the edge direction. To cope with this problems, the present invention measures similarities between the G channel value, and the R channel value and the B channel value based on the interpolation results of the horizontal and vertical directions, and carries out the G channel interpolation in a direction where the measured similarity becomes the maximized. However, when the reliability of the measured similarity becomes poor, a final interpolation result is determined using a weighted average value using similarity information of each direction and interpolation results of the horizontal and vertical directions.

Figure 6:
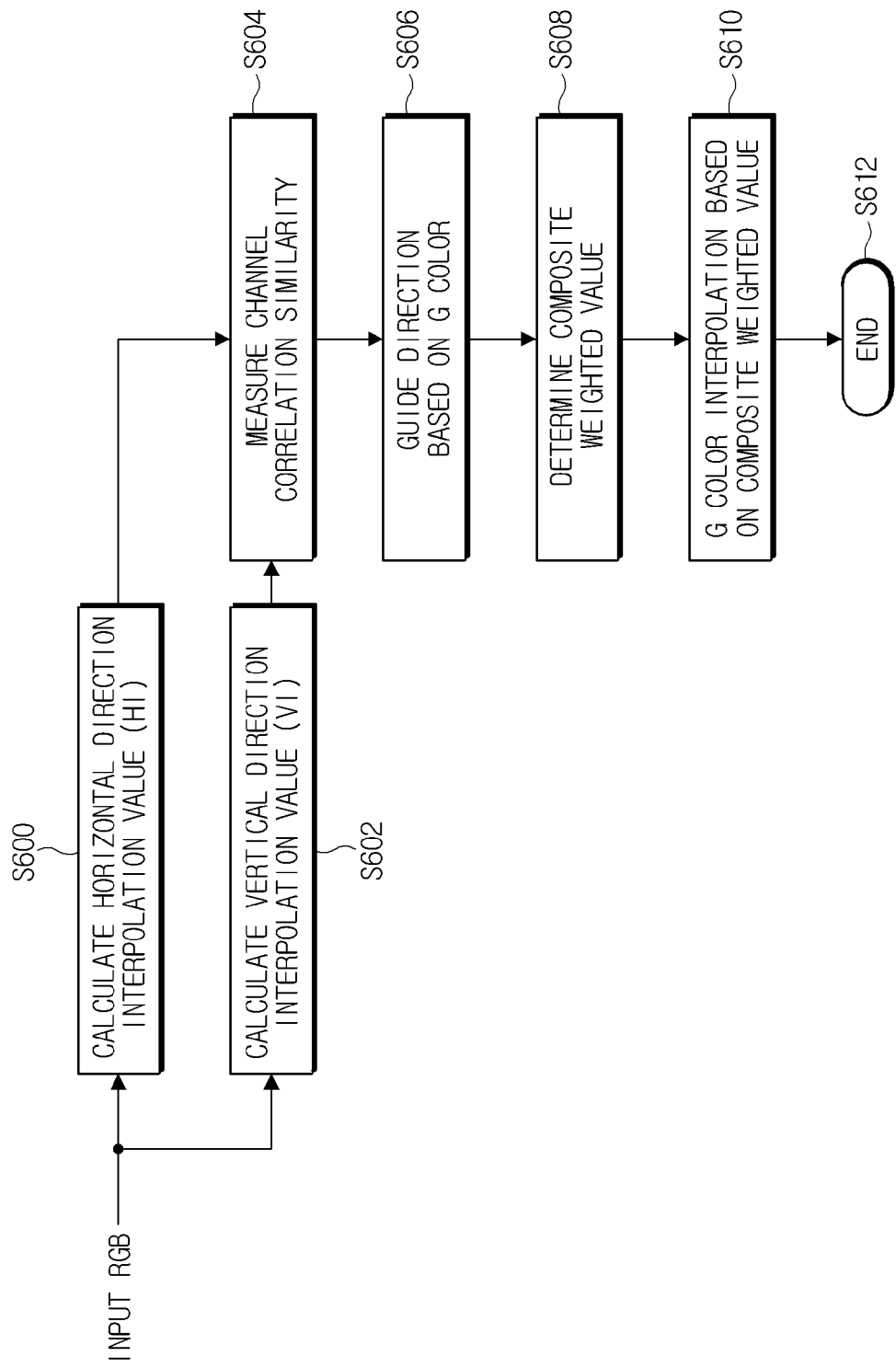
FIG. 6 is another flow chart illustrating a procedure of carrying out a RGB color filter interpolation in accordance with an exemplary embodiment of the present invention.

FIG. 6 is a flow chart illustrating a procedure of carrying out the G color filter interpolation in accordance with an exemplary embodiment of the present invention.

In a operation S600, the color interpolation unit calculates a horizontal direction interpolation result, and in a operation S602, it calculates a vertical direction interpolation result. In a operation S606, the color interpolation unit receives the calculated horizontal direction interpolation result, and measures a horizontal direction channel correlation similarity. In addition, the color interpolation unit receives the calculated vertical direction interpolation result, and measures a vertical direction channel correlation similarity.

Hereinafter, an example of calculating the horizontal direction interpolation result and the vertical direction interpolation result by means of the color interpolation unit will be described with reference to FIG. 7. In particular, an example of calculating the G channel value with respect to the pixel $R_{13}$ of FIG. 7 will be described. Equation 5 below corresponds to an example of calculating the horizontal direction interpolation result.

$(G-R)_{HL}=|G_{12}-(R_{11}+R_{13})/2|$ $(G-R)_{HR}=|G_{14}-(R_{13}+R_{15})/2|$ $(G-R)_{HC}=|G_{Horz}-R_{13}|$ $G_{Horz}=(G_{12}+G_{14})/2+(R_{11}-2\times R_{13}+R_{15})/4$  Equation 5

$(G-R)_{HL}$ denotes a left component in the horizontal direction interpolation result, and $(G-R)_{HR}$ denotes a right component in the horizontal direction interpolation result. In addition, $(G-R)_{HC}$ denotes a center component in the horizontal direction interpolation result, and $G_{Horz}$ denotes the horizontal direction interpolation result. Equation 6 below corresponds to an equation of calculating the horizontal direction channel correlation similarity.

Horizontal direction channel correlation similarity=
$|(G-R)_{HL}-(G-R)_{HC}|+|(G-R)_{HR}-(G-R)_{HC}|$  Equation 6

Equation 7 below corresponds to an example of calculating the vertical direction interpolation result.

$(G-R)_{VU}=|G_8-(R_3+R_{13})/2|$ $(G-R)_{VD}=|G_{18}-(R_{13}+R_{23})/2|$ $(G-R)_{VC}=|G_{Vert}-R_{13}|$ $G_{Vert}=(G_8+G_{18})/2+(R_3-2\times R_{13}+R_{23})/4$  Equation 7

$(G-R)_{VU}$ denotes an upper component in the vertical direction interpolation result, and $(G-R)_{VD}$ denotes a lower component in the vertical direction interpolation result. In addition, $(G-R)_{VC}$ denotes a center component in the vertical direction interpolation result, and $G_{Vert}$ denotes the vertical direction interpolation result. Equation 8 below corresponds to an equation of calculating the vertical direction channel correlation similarity.

Vertical direction channel correlation similarity=
$|(G-R)_{VU}-(G-R)_{VC}|+|(G-R)_{VD}-(G-R)_{VC}|$  Equation 8

The color interpolation unit calculates a difference between the horizontal direction channel correlation similarity calculated by Equation 6 and the vertical direction channel correlation similarity calculated by Equation 8. When the difference is greater than a threshold value, a similarity in a specific direction is large, so that channel values of pixels positioned in the specific direction are used to carry out the G channel interpolation. When the difference is less than the threshold value, which corresponds to a case that a difference between the vertical direction similarity and the horizontal direction similarity is small, so that channel values of pixels positioned in both directions are used to carry out the G channel interpolation. In a operation S606, the color interpolation unit guides the interpolation direction based on the G channel. Equation 9 below corresponds to an example of guiding the interpolation direction in the color interpolation unit.

$$\Delta V_N = |G_2 - G_{12}| + |G_{12} - G_{22}| + |G_4 - G_{14}| |G_{14} - G_{24}|$$

$$\Delta V_C = |G_8 - G_{18}|$$

$$\Delta H_N = |G_6 - G_8| + |G_8 - G_{10}| + |G_{16} - G_{18}| |G_{18} - G_{20}|$$

$$\Delta H_C = |G_{12} - G_{14}| \quad \text{Equation 9}$$

The color interpolation unit determines whether a ratio between $\Delta V_C$ and $\Delta H_C$ calculated in Equation 9 is less than 8. When the ratio is greater than 8, the color interpolation unit replaces $\Delta V_C$ with $\Delta V$ and replaces $\Delta H_C$ with $\Delta H$. When the ratio is less than 8, it replaces $\Delta V_N$ with $\Delta V$ and replaces $\Delta H_N$ with $\Delta H$.

In a operation S608, the color interpolation unit determines a composite weighted value. Hereinafter, a horizontal direction composite weighted value is referred to as $\alpha$, and a vertical direction composite weighted value is referred to as $\beta$. A procedure of determining the composite weighted value will be described later.

In a operation S610, the color interpolation unit carries out the G channel interpolation using the composite weighted value determined in the operation S608. Equation 10 below corresponds to an equation of carrying out the G channel interpolation.

$$G_{interpolation} = \alpha \times G_{Horz} + \beta \times G_{Vert} \quad \text{Equation 10}$$

Hereinafter, a method of determining the composite weighted value will be described.

(A) A case that the vertical direction channel correlation similarity is higher than the horizontal direction channel correlation similarity The color interpolation unit determines $\alpha$ as 1 and $\beta$ as 0 when a difference between the vertical direction channel correlation similarity and the horizontal direction channel correlation similarity is greater than the threshold value. When the difference is less than the threshold value, the color interpolation unit compares a magnitude of $\Delta H$ and a magnitude of $\Delta V$. When $\Delta H$ is greater than $2 \times \Delta V$, the color interpolation unit determines $\alpha$ as 0 and $\beta$ as 1. When $\Delta H$ is less than $0.5 \times \Delta V$, the color interpolation unit determines $\alpha$ as 1 and $\beta$ as 0. When $\Delta H$ is between $0.5 \times \Delta V$ and $2 \times \Delta V$, the color interpolation unit determines $\alpha$ as 1/(1+horizontal direction channel correlation similarity) and $\beta$ as 1/(1+vertical direction channel correlation similarity).

(B) A case that the horizontal direction channel correlation similarity is higher than the vertical direction channel correlation similarity The color interpolation unit determines $\alpha$ as 0 and $\beta$ as 1 when a difference between the vertical direction channel correlation similarity and the horizontal direction channel correlation similarity is greater than the threshold value. When the difference is less than the threshold value, the color interpolation unit compares a magnitude of $\Delta H$ and a magnitude of $\Delta V$. When $\Delta H$ is greater than $2 \times \Delta V$, the color interpolation unit determines $\alpha$ as 0 and $\beta$ as 1. When $\Delta H$ is less than $0.5 \times \Delta V$, the color interpolation unit determines $\alpha$ as 1 and $\beta$ as 0. When $\Delta H$ is between $0.5 \times \Delta V$ and $2 \times \Delta V$, the color interpolation unit determines $\alpha$ as 1/(1+horizontal direction channel correlation similarity) and $\beta$ as 1/(1+vertical direction channel correlation similarity).

(C) A case that the horizontal direction channel correlation similarity is equal to the vertical direction channel correlation similarity.

The color filter compares a magnitude of $\Delta H$ and a magnitude of $\Delta V$. When $\Delta H$ is greater than $2 \times \Delta V$, the color interpolation unit determines $\alpha$ as 0 and $\beta$ as 1. When $\Delta H$ is less than $0.5 \times \Delta V$, the color interpolation unit determines $\alpha$ as 1 and $\beta$ as 0. When $\Delta H$ is equal to $\Delta V$, the color interpolation unit determines $\alpha$ as ½ and $\beta$ as ½. When $\Delta H$ is not equal to $\Delta V$ and is between $0.5 \times \Delta V$ and $2 \times \Delta V$, the color interpolation unit determines $\alpha$ as 1/(1+horizontal direction channel correlation similarity) and $\beta$ as 1/(1+vertical direction channel correlation similarity).

2) R Channel and B Channel Interpolation Using Multi-Direction Edge Information

A method of acquiring (interpolating) B channel values from a pixel having the R channel values or R channel values from a pixel having the B channel values will be first described. Interpolation of the R channel values and the B channel values is carried out such that edges are measured by the information about the smoothness of the interpolated G channel values, and the interpolation between the R channel values and the B channel values is carried out using the directional information of the G channel values around the edge when the edge is present. Hereinafter, a direction for the color interpolation will be described. Table 1 below shows directions for the color interpolation.

TABLE 1

| | |
|---|---|
| Zero direction | $R_{13} \rightarrow G_8$ |
| First direction | $R_{13} \rightarrow G_{18}$ |
| Second direction | $R_{13} \rightarrow G_{14}$ |
| Third direction | $R_{13} \rightarrow G_{12}$ |
| Fourth direction | $R_{13} \rightarrow G_2$ |
| Fifth direction | $R_{13} \rightarrow G_4$ |
| Sixth direction | $R_{13} \rightarrow G_{10}$ |
| Seventh direction | $R_{13} \rightarrow G_{20}$ |
| Eighth direction | $R_{13} \rightarrow G_{24}$ |
| Ninth direction | $R_{13} \rightarrow G_{22}$ |
| Tenth direction | $R_{13} \rightarrow G_{16}$ |
| Eleventh direction | $R_{13} \rightarrow G_6$ |

Hereinafter, a method of interpolating the B channel in $R_{13}$ will be described. The color interpolation unit compares the channel values of the pixels positioned around $R_{13}$ to determine a direction where the color interpolation is to be carried out. The table 2 below shows differences of channel values between pixels positioned in each direction.

TABLE 2

| | |
|---|---|
| SAD0(zero direction, second direction) | difference between channel values of $G_2$ and $G_{12}$ + difference between channel values of $G_{12}$ and $G_{22}$ + difference between channel values of $G_4$ and $G_{14}$ + difference between channel values of $G_{14}$ and $G_{24}$ |
| SAD1(first direction, third direction) | difference between channel values of $G_6$ and $G_8$ + difference between channel values of $G_8$ and $G_{10}$ + difference between channel values of $G_{16}$ and $G_{18}$ + difference between channel values of $G_{18}$ and $G_{20}$ |
| SAD2(fourth direction, eighth direction) | difference between channel values of $G_{26}$ and $G_{12}$ + difference between channel values of $G_{12}$ and $G_{24}$ + difference between channel values of $G_2$ and $G_{14}$ + difference between channel values of $G_{14}$ and $G_{27}$ |
| SAD3(fifth direction, ninth direction) | difference between channel values of $G_4$ and $G_{12}$ + difference between channel values of $G_{12}$ and $G_{29}$ + difference between channel values of $G_{28}$ and $G_{14}$ + difference between channel values of $G_{14}$ and $G_{22}$ |
| SAD4(sixth direction, tenth direction) | difference between channel values of $G_8$ and $G_{30}$ + difference between channel values of $G_{10}$ and $G_{12}$ + difference between channel values of $G_{14}$ and $G_{16}$ + difference between channel values of $G_{31}$ and $G_{18}$ |

TABLE 2-continued

| | |
|---|---|
| SAD5(seventh direction, eleventh direction) | difference between channel values of $G_{30}$ and $G_{18}$ + difference between channel values of $G_6$ and $G_{14}$ + difference between channel values of $G_{12}$ and $G_{20}$ + difference between channel values of $G_8$ and $G_{31}$ |

The color interpolation unit determines the edge direction using the calculated sum of absolute difference (SAD). Hereinafter, a procedure of determining the edge direction in the color interpolation unit will be described. Each term for color interpolation in the color interpolation unit is defined as Equation 11 below.

$$\text{Mean}_{SAD}\ (2\ \text{to}\ 5)=\text{Mean}(SAD2, SAD3, SAD4, SAD5)$$

$$\text{Min}_{SAD}\ (2\ \text{to}\ 5)=\text{Min}(SAD2, SAD3, SAD4, SAD5)$$

$$\text{Sum}_{SAD}\ (0\ \text{to}\ 1)=SAD0+SAD1$$

$$\text{Min}_{SAD}\ (0\ \text{to}\ 1)=\text{Min}(SAD0, SAD1)$$

$$\text{Max}_{SAD}\ (0\ \text{to}\ 1)=\text{Max}(SAD0, SAD1) \quad \text{Equation 11}$$

The color interpolation unit determines the edge direction as shown in the table 3 below.

TABLE 3

| Condition | Edge direction |
|---|---|
| $\text{Sum}_{SAD}$ (0 to 1) = 0 and $\text{Mean}_{SAD}$ (2 to 5) ≠ 0 | Sixth direction |
| $\text{Sum}_{SAD}$ (0 to 1) ≠ 0 and $\text{Mean}_{SAD}$ (2 to 5) = 0 | Seventh direction |
| $\text{Sum}_{SAD}$ (0 to 1) = 0 and $\text{Mean}_{SAD}$ (2 to 5) = 0 | Sixth direction |
| $\text{Sum}_{SAD}$ (0 to 1) ≠ 0 and $\text{Mean}_{SAD}$ (2 to 5) ≠ 0 | |
| 1) $\text{Mean}_{SAD}$ (2 to 5) × $\text{Min}_{SAD}$ (0 to 1) < $\text{Max}_{SAD}$ (0 to 1) × $\text{Min}_{SAD}$ (2 to 5) | Sixth direction |
| 2) $\text{Min}_{SAD}$ (2 to 5) = SAD2 | Fifth direction |
| 3) $\text{Min}_{SAD}$ (2 to 5) = SAD3 | First direction |
| 4) $\text{Min}_{SAD}$ (2 to 5) = SAD4 | Second direction |
| 5) $\text{Min}_{SAD}$ (2 to 5) = SAD5 | Fourth direction |

As such, after determining the edge direction to be considered using the G channel values, the color interpolation unit carries out the B color interpolation using the channel values of pixels positioned in an opposite direction to the edge direction. Hereinafter, a method of carrying out interpolation in the color interpolation unit per each direction will be described. Terms i,j mean (x,y) coordinates of $R_{13}$ where the color interpolation is to be carried out on the B channel.

(A) When the edge direction to be considered is the sixth direction:

$$K1=(\text{int})(0.25*(\text{Gre}[i-1][j-1]-\text{Blu}[i-1][j-1]));$$

$$K2=(\text{int})(0.25*(\text{Gre}[i-1][j+1]-\text{Blu}[i-1][j+1]));$$

$$K3=(\text{int})(0.25*(\text{Gre}[i+1][j-1]-\text{Blu}[i+1][j-1]));\ \text{and}$$

$$K4=(\text{int})(0.25*(\text{Gre}[i+1][j+1]-\text{Blu}[i+1][j+1]));\}.$$

(B) When the edge direction to be considered is the fist direction:

$$K1=(\text{int})(0.5*(\text{Gre}[i-2][j+1]-(\text{Blu}[i-3][j+1]+\text{Blu}[i-1][j+1])/2));$$

$$K2=(\text{int})(0.5*(\text{Gre}[i+2][j-1]-(\text{Blu}[i+1][j-1]+\text{Blu}[i+3][j-1])/2));$$

K3=0; and

K4=0.

(C) When the edge direction to be considered is the second direction:

$$K1=(\text{int})(0.5*(\text{Gre}[i-1][j+2]-(\text{Blu}[i-1][j+1]+\text{Blu}[i-1][j+3])/2));$$

$$K2=(\text{int})(0.5*(\text{Gre}[i+1][j-2]-(\text{Blu}[i+1][j-3]+\text{Blu}[i+1][j-1])/2));$$

K3=0; and

K4=0.

(C) When the edge direction to be considered is the fourth direction $$K1=(\text{int})(0.5*(\text{Gre}[i-1][j-2]-(\text{Blu}[i-1][j-3]+\text{Blu}[i-1][j-1])/2));$$

$$K2=(\text{int})(0.5*(\text{Gre}[i+1][j+2]-(\text{Blu}[i+1][j+1]+\text{Blu}[i+1][j+3])/2));$$

K3=0; and

K4=0.

(E) When the edge direction to be considered is the fifth direction:

$$K1=(\text{int})(0.5*(\text{Gre}[i-2][j-1]-(\text{Blu}[i-3][j-1]+\text{Blu}[i-1][j-1])/2));$$

$$K2=(\text{int})(0.5*(\text{Gre}[i+2][j-1]-(\text{Blu}[i+1][j-1]+\text{Blu}[i+3][j-1])/2));$$

K3=0; and

K4=0.

(F) When the edge direction to be considered is the seventh direction:

$$K1=(\text{int})(0.25*(\text{Gre}[i-2][j-1]-(\text{Blu}[i-3][j-1]+\text{Blu}[i-1][j-1])/2));$$

$$K2=(\text{int})(0.25*(\text{Gre}[i+2][j-1]-(\text{Blu}[i+1][j-1]+\text{Blu}[i+3][j-1])/2));$$

$$K3=(\text{int})(0.25*(\text{Gre}[i-2][j+1]-(\text{Blu}[i-3][j+1]+\text{Blu}[i-1][j+1])/2));\ \text{and}$$

$$K4=(\text{int})(0.25*(\text{Gre}[i+2][j-1]-(\text{Blu}[i+1][j-1]+\text{Blu}[i+3][j-1])/2)).$$

The color interpolation unit carries out the color interpolation on the B channel using K1 to K4 calculated in (A) to (F). Equation 12 below corresponds to an example of carrying out the color interpolation in the color interpolation unit.

$$\text{Blue}[i][j]=\text{Gre}[i][j]-(K1+K2+K3+K4) \quad \text{Equation 12}$$

Hereinafter, a case of having no edge components will be described. When the edge component is not present, the color interpolation unit carries out the color interpolation using the channel values of pixels positioned around a pixel where the interpolation is to be carried out. Equation 13 below corresponds to an equation of carrying out the color interpolation using the pixels positioned around the pixel in the color interpolation unit when the edge component is not present.

$$B_{13}=G_{13}-(W_1 \times CD_1+W_2 \times CD_2+W_3 \times CD_3+W_4 \times CD_4)/(W_1+W_2+W_3W_4) \quad \text{Equation 13}$$

$CD_1$ is $G_7-B_7$, $CD_2$ is $G_9-B_9$, $CD_3$ is $G_{17}-B_{17}$, and $CD_4$ is $G_{19}-B_{19}$. In addition, $W_1$ is $1/(1+CD_1)$, $W_2$ is $1/(1+CD_2)$, $W_3$ is $1/(1+CD_3)$, and $W_4$ is $1/(1+CD_4)$.

In addition, Equation 13 corresponds to an equation of interpolating B channel values from a pixel having the R channel values or R channel values from a pixel having the B channel values.

However, a method of interpolating the R channel values or the B channel values from a pixel having the G channel pixels in the color interpolation unit is same as Equation 14 below.

$$B_8 = G_8 - (W_1 \times CD_1 + W_2 \times CD_2)/(W_1 + W_2) \quad \text{Equation 14}$$

$CD_1$ is $G_7-B_7$, $CD_2$ is $G_9-B_9$, $W_1$ is $1/(1+CD_1)$, and $W_2$ is $1/(1+CD_2)$.

As described above, the present invention carries out the G color interpolation using the color correlation similarity, and carries out the R and B channels using the multi-direction edge components, so that the color fringe errors can be reduced, and degradation of the image quality can be reduced. In addition, the zipper artifacts occurred when the edge information is not considered at the time of interpolating the G channel, can be prevented.

The foregoing exemplary embodiment and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method of acquiring a green (G) channel value in a pixel having a red (R) channel value or a blue (B) channel value in a video display apparatus displaying a video input using a plurality of pixels, each pixel having one channel value among three channel values of R, G, and B colors, the method comprising:
    calculating first correlation similarity based on a difference between channel values of pixels positioned in a vertical direction, and second correlation similarity based on a difference between channel values of pixels positioned in a horizontal direction; and
    if a difference between the first correlation similarity and the second correlation similarity is not less than a threshold value, acquiring the G channel value from channel values of the pixels positioned in one of the horizontal direction and the vertical direction.

2. The method according to claim 1, wherein the second correlation similarity is obtained by calculating a difference between channel values of at least two pixels positioned in a left direction, a difference between channel values of at least two pixels positioned in a right direction, and a difference of channel values of at least two pixels positioned in both of the right and left directions, and the second correlation similarity is a sum of an absolute value of the difference of the channel values in the right direction and the difference of the channel values in both of the right and left directions, plus an absolute value of the difference of the channel values in the left direction and the difference of the channel values in both of the right and left directions.

3. The method according to claim 2, wherein the difference of the channel values of the at least two pixels positioned in the left direction is a difference between a channel value of an adjacent pixel, and an average value of the channel value of the pixel and the channel value of an adjacent pixel of the adjacent pixel.

4. The method according to claim 3, wherein the difference of the channel values of the at least two pixels positioned in the right and left directions is a difference between the channel value of the pixel, and a sum of an average value of the channel values of adjacent pixels positioned in the right and left directions and an average value of the channel values of adjacent pixels of the adjacent pixel.

5. The method according to claim 1, wherein the first correlation similarity is obtained by calculating a difference between channel values of at least two pixels positioned in an upper direction, a difference between channel values of at least two pixels positioned in a lower direction, and a difference of channel values of at least two pixels positioned in both of the upper and lower directions, and the first correlation similarity is a sum of an absolute value of the difference of the channel values in the upper direction and the difference of the channel values in both of the upper and lower directions, plus an absolute value of the difference of the channel values in the lower direction and the difference of the channel values in both of the upper and lower directions.

6. The method according to claim 5, wherein the difference of the channel values of the at least two pixels positioned in the upper direction is a difference between a channel value of an adjacent pixel, and an average value of the channel value of the pixel and a channel value of an adjacent pixel of the adjacent pixel.

7. The method according to claim 6, wherein the difference of the channel values of the at least two pixels positioned in the upper and lower directions is a difference between the channel value of the pixel, and a sum of an average value of the channel values of adjacent pixels positioned in the upper and lower directions and an average value of the channel values of adjacent pixels of the adjacent pixel.

8. The method according to claim 1, further comprising if the difference between the first correlation similarity and the second correlation similarity is less than the threshold value, acquiring the G channel value from the channel values of the pixels positioned in at least one of the horizontal direction and the vertical direction.

9. A method of acquiring a red (R) channel value in a pixel having a blue (B) channel value in a video display apparatus displaying a video input using a plurality of pixels, each pixel having one channel value among three channel values of R, green (G), and B colors, the method comprising:
    acquiring an edge direction from channel values of pixels each having a G channel value positioned around the pixel; and
    acquiring the R channel value from G channel values and B channel values of pixels positioned in the acquired edge direction.

10. The method according to claim 9, wherein the R channel value is acquired from the G channel value acquired from the pixel having the B channel value positioned around the pixel if the edge direction is not present.

11. A method of acquiring a red (R) channel value in a pixel having a channel value in a video display apparatus displaying the video input using a plurality of pixels, each pixel having one channel value among three channel values of R, G, and blue (B) colors, the method comprising:
    calculating first correlation similarity based on a difference between channel values of pixels positioned in a vertical direction, and second correlation similarity based on a difference between channel values of pixels positioned in a horizontal direction;
    acquiring a G channel value of the pixel from channel values of the pixels positioned in one of the horizontal direction and the vertical direction if a difference between the first correlation similarity and the second correlation similarity is not less than a threshold value; and
    acquiring the R channel value of the pixel from the acquired G channel value and channel values of pixels positioned around the pixel.

* * * * *